United States Patent
Yoshii (10) Patent No.: US 12,158,669 B2
(45) Date of Patent: Dec. 3, 2024

(54) ELECTRO-OPTICAL DEVICE AND ELECTRONIC APPARATUS

(71) Applicant: SEIKO EPSON CORPORATION, Tokyo (JP)

(72) Inventor: Masahito Yoshii, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/419,502

(22) Filed: Jan. 22, 2024

(65) Prior Publication Data

US 2024/0248350 A1    Jul. 25, 2024

(30) Foreign Application Priority Data

Jan. 25, 2023   (JP) ................. 2023-009427

(51) Int. Cl.
*G02F 1/1343*    (2006.01)
*G02F 1/1339*    (2006.01)

(52) U.S. Cl.
CPC ...... *G02F 1/134309* (2013.01); *G02F 1/1339* (2013.01)

(58) Field of Classification Search
None
See application file for complete search history.

(56) References Cited

U.S. PATENT DOCUMENTS

| | | | | |
|---|---|---|---|---|
| 2004/0239650 | A1* | 12/2004 | Mackey | G06F 3/0446 345/174 |
| 2014/0160413 | A1* | 6/2014 | Nishida | G02F 1/134309 349/123 |
| 2019/0355319 | A1* | 11/2019 | Yatabe | G09G 3/3614 |
| 2020/0310209 | A1* | 10/2020 | Okuyama | G02F 1/13394 |
| 2020/0393710 | A1* | 12/2020 | Tomikawa | G02F 1/134309 |
| 2022/0342244 | A1* | 10/2022 | Miyawaki | G02F 1/1368 |

FOREIGN PATENT DOCUMENTS

JP    2015215536    12/2015

* cited by examiner

*Primary Examiner* — Ryan Crockett
(74) *Attorney, Agent, or Firm* — JCIPRNET (57) ABSTRACT

An electro-optical device is an display device provided with a display region for displaying an image and a peripheral region provided outside the display region, and includes a first substrate including a plurality of pixel electrodes provided in the display region, a second substrate including a counter electrode facing the plurality of pixel s, a seal member being provided in the peripheral region, and containing a UV-curable material, and an electro-optical layer being arranged in a region surrounded by at the first substrate, the second substrate, and the seal member and having optical characteristics that change in accordance with an electric field, wherein one substrate of the first substrate and the second substrate includes a non-conductive region that overlaps with the seal member in plan view, is in the same layer as the plurality of pixel electrodes or the counter electrode, and is not provided with a film having conductivity.

8 Claims, 9 Drawing Sheets

ELECTRO-OPTICAL DEVICE AND ELECTRONIC APPARATUS

The present application is based on, and claims priority from JP Application Serial Number 2023-009427, filed Jan. 25, 2023, the disclosure of which is hereby incorporated by reference herein in its entirety.

BACKGROUND

1. Technical Field

The present disclosure relates to an electro-optical device and an electronic apparatus.

2. Related Art

For example, an electro-optical devices such as a liquid crystal display device in which optical characteristics can be changed for each pixel is used for an electronic apparatus such as a projector. As an example of the electro-optical device, an electro-optical device described in JP-A-2015-215536 has been known.

The electro-optical device described in JP-A-2015-215536 includes an element substrate, a counter substrate, a seal material arranged between those substrates, and an electro-optical layer provided in a region surrounded by the seal material. At a surface of the element substrate that faces the counter substrate, a plurality of pixel electrodes are arranged in a region in which the electro-optical layer is provided, and an ITO film having a predetermined film thickness is arranged in a region to which the seal material is provided. In JP-A-2015-215536, in order to cure the seal material efficiently, a transmittance at 350 nm in a region of the element substrate in which the seal material is provided is higher than a transmittance at 350 nm in a region of the element substrate in which the electro-optical layer is provided.

However, with the configuration in the related art, the ITO film is present in the region in which the seal material is provided. Thus, the transmittance at 350 nm cannot sufficiently be increased, and a UV irradiation time for curing the seal material with UV is increased. As a result, productivity is degraded. Moreover, as the UV irradiation time is increased, a temperature of each substrate is increased due to UV irradiation. As a result, contaminants that cause display stains may be increased. As a result, display quality may be degraded.

SUMMARY

An aspect of an electro-optical device of the present disclosure is a display device provided with a display region for displaying an image and a peripheral region provided outside the display region in plan view, and includes a first substrate including a plurality of pixel electrodes provided in the display region, a second substrate including a counter electrode facing the plurality of pixel electrodes, a seal member being provided in the peripheral region, being arranged between the first substrate and the second substrate, and containing a UV-curable material, and an electro-optical layer being arranged in a region surrounded by at the first substrate, the second substrate, and the seal member and having optical characteristics that change in accordance with an electric field, wherein one substrate of the first substrate and the second substrate includes a non-conductive region that overlaps with the seal member in plan view, is in the same layer as the plurality of pixel electrodes or the counter electrode, and is not provided with a film having conductivity.

DESCRIPTION OF EMBODIMENTS

Preferred exemplary embodiments according to the present disclosure are described below with reference to the attached drawings. Note that, in the drawings, the dimension or scale of each part may differ from the actual one as appropriate, and some parts are schematically illustrated for ease of understanding. Further, the scope of the present disclosure is not limited to these forms, unless otherwise stated in the following description to limit the present disclosure.

1. Electro-Optical Device

A. First Exemplary Embodiment

A-1. Basic Configuration

Figure 1:
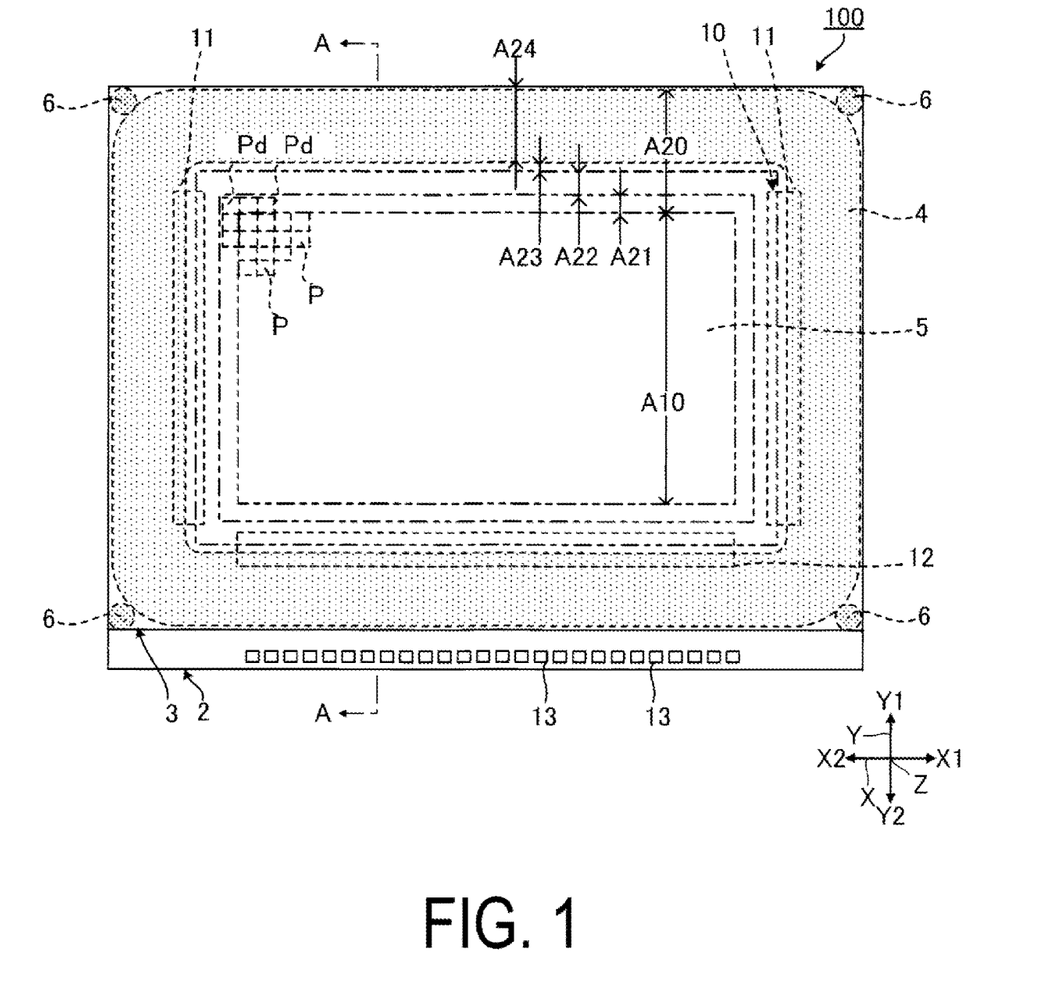
FIG. 1 is a plan view of an electro-optical device according to an exemplary embodiment.
Figure 2:
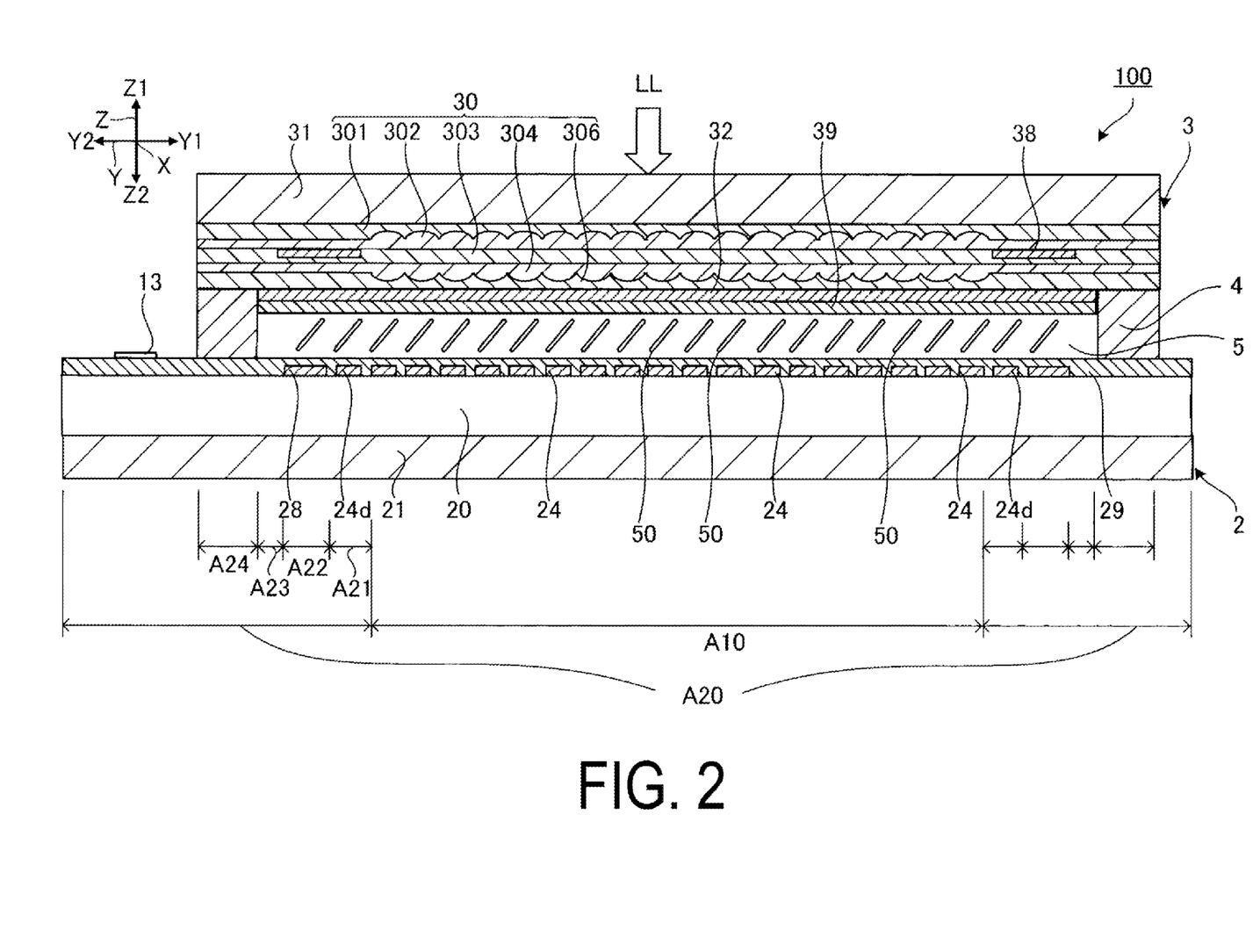
FIG. 2 is a cross-sectional view of the electro-optical device illustrated in FIG. 1 taken along the line A-A.

FIG. 1 is a plan view of an electro-optical device 100 according to an exemplary embodiment. FIG. 2 is a cross-sectional view of the electro-optical device 100 illustrated in FIG. 1 taken along the line A-A. An X axis, a Y axis, and a Z axis that are orthogonal to one another are used below as appropriate for convenience of description. Further, one direction along the X axis is denoted as an X1 direction, and the direction opposite to the X1 direction is denoted as an X2 direction. Likewise, one direction along the Y axis is denoted as a Y1 direction, and the direction opposite to the Y1 direction is denoted as a Y2 direction. One direction along the Z axis is denoted as a Z1 direction, and the direction opposite to the Z1 direction is denoted as a Z2 direction.

Further, in this specification, "an element β on an element α" means that the element β is located on the upper side of the element α. Therefore, "an element β on an element α" includes not only a case where the element β is in direct contact with element α, but also a case where the element α and the element β are separated from each other. Further, "electrical coupling" between the element α and the element β includes not only a configuration where the element α and the element β conduct by being directly joined to each other, but also a configuration where the element α and the element β indirectly conduct through another conductive material.

The electro-optical device 100 illustrated in FIGS. 1 and 2 is a transmissive electro-optical device of an active matrix driving type. The electro-optical device 100 includes a first substrate 2, a second substrate 3, a seal member 4 having a frame-like shape, and a liquid crystal layer 5. As illustrated in FIG. 2, the first substrate 2, the liquid crystal layer 5, and the second substrate 3 are arrayed in the Z1 direction in the stated order. Note that viewing from the Z1 direction or the Z2 direction, which is a direction in which the first substrate 2, the liquid crystal layer 5, and the second substrate 3 overlap with one another, is referred to as "plan view". Further, the plan shape of the electro-optical device 100 illustrated in FIG. 1 is a rectangular shape, but may be a polygonal shape other than a rectangular shape or a circular shape. In the present exemplary embodiment, the second substrate 3 corresponds to "one substrate", and the first substrate 2 corresponds to "another substrate".

The electro-optical device 100 is a transmissive type, and the first substrate 2 and the second substrate 3 have the light-transmitting property. As illustrated in FIG. 2, incident light LL enters the second substrate 3, and then is emitted from the first substrate 2. During this, the incident light LL is modulated to display an image. Note that an image may be displayed by modulating light while the light enters the first substrate 2 and then is emitted from the second substrate 3. Further, the "light-transmitting property" indicates transmissivity with respect to visible light, and may indicate a transmittance of visible light of 50% or greater.

The first substrate 2 includes a substrate 21, a first laminated body 20, a plurality of pixel electrodes 24, a plurality of dummy pixel electrodes 24d, a peripheral electrode 28, and a first alignment film 29. The substrate 21, the first laminated body 20, the plurality of pixel electrodes 24, and the first alignment film 29 are laminated in the Z1 direction in the stated order.

The substrate 21 is a flat plate having the light-transmitting property and the insulating property, and is formed of a glass substrate or a quarts substrate, for example. Although not illustrated in detail, the first laminated body 20 includes a plurality of insulating films having the light-transmitting property. Further, although not illustrated in detail, the first laminated body 20 is provided with a transistor, various wiring lines, and the like. The plurality of pixel electrodes 24, the plurality of dummy pixel electrodes 24d, and the peripheral electrode 28 are arranged at the first laminated body 20, and are provided in the same layer. The plurality of pixel electrodes 24 are used to apply an electric field to the liquid crystal layer 5. The plurality of dummy pixel electrodes 24d do not distribute to display, but are subjected to driving control similarly to the plurality of pixel electrodes 24. For example, the plurality of dummy pixel electrodes 24d are used as a measure against noise of an image signal written in the plurality of pixel electrodes 24. The peripheral electrode 28 is an ion-trapping electrode for trapping ionic impurities in the liquid crystal layer 5. For example, the peripheral electrode 28 forms a frame-like shape in plan view. Note that a plurality of peripheral electrodes 28 may be provided, and the frame-like shape in plan view is not required to be formed.

As illustrated in FIG. 1, the plurality of dummy pixel electrodes 24d surround the plurality of pixel electrodes 24 in plan view. Each of the plurality of pixel electrodes 24, the plurality of dummy pixel electrodes 24d, and the peripheral electrode 28 contains a transparent conductive material such as Indium Tin Oxide (ITO), Indium Zinc Oxide (IZO), and Fluorine-doped tin oxide (FTO). Further, the first alignment film 29 illustrated in FIG. 2 has the light-transmitting property and the insulating property. The first alignment film 29 contacts with the liquid crystal layer 5, and aligns liquid crystal molecules 50 of the liquid crystal layer 5. The first alignment film 29 is arranged to cover the plurality of pixel electrodes 24, the plurality of dummy pixel electrodes 24d, and the plurality of peripheral electrodes 28. The material of the first alignment film 29 is polyimide, silicon oxide, and the like.

Further, as illustrated in FIG. 1, at the first substrate 2, a driving circuit 10 and a plurality of external terminals 13 are arranged. The driving circuit 10 includes a scanning line driving circuit 11 and a signal line driving circuit 12. Although omitted in illustration, some of the plurality of external terminals 13 are coupled to wiring lines drawn from the driving circuit 10. Further, the plurality of external terminals 13 include a terminal to which a constant potential Vcom is applied.

The second substrate 3 illustrated in FIG. 2 is arranged to face the first substrate 2. The second substrate 3 includes a substrate 31, a second laminated body 30, a counter electrode 32, a second alignment film 39, and a parting 38. The substrate 31, the second laminated body 30, the counter electrode 32, and the second alignment film 39 are laminated in the Z2 direction in the stated order. Further, the second substrate 3 includes the plurality of electrodes 33 and a conductive portion 34 illustrated in FIG. 4, which is described later in detail.

The substrate 31 is a flat plate having the light-transmitting property and the insulating property, and is formed of a glass substrate or a quarts substrate, for example. The second laminated body 30 includes an insulating layer 301, a lens layer 302, an insulating layer 303, a lens layer 304, and an insulating layer 305. The insulating layer 301, the lens layer 302, the insulating layer 303, the lens layer 304, and the insulating layer 305 are laminated from the substrate 31 in the Z2 direction in the stated order. Each of the layers has the light-transmitting property and the insulating property, and is formed of an inorganic material containing silicon such as silicon oxide.

The insulating layer 301 includes a plurality of concave portions. The lens layer 302 includes a plurality of convex lenses that protrude in the Z1 direction from the insulating layer 303. The plurality of convex lenses contact with the plurality of concave portions of the insulating layer 301. The insulating layer 303 is provided with the parting 38. Although not illustrated in detail, the parting 38 functions as a light-blocking parting surrounding the plurality of pixel electrodes 24 in plan view. Note that the "light-blocking property" means a light-blocking property to visible light, may indicate a transmittance to visible light of less than 50%, and may further indicate a transmittance to visible light of 10% or less. The lens layer 304 includes a plurality of convex lenses that protrude in the Z2 direction from the insulating layer 303. The insulating layer 305 includes a plurality of concave portion. The plurality of concave portions contact with the plurality of convex lenses of the lens layer 304. The insulating layer 305 contacts with the counter electrode 32. The surface of the insulating layer 305 that contacts with the counter electrode 32 is a flat surface.

The counter electrode 32 is a counter electrode that faces the plurality of pixel electrodes 24 via the liquid crystal layer 5. The counter electrode 32 is used to apply an electric field to the liquid crystal layer 5. The counter electrode 32 has the light-transmitting property and conductivity. The counter electrode 32 contains a transparent conductive material such as ITO, IZO, and FTO. The second alignment film 39 has the light-transmitting property and the insulating property. The second alignment film 39 aligns the liquid crystal molecules of the liquid crystal layer 5. The material of the second alignment film 39 is polyimide, silicon oxide, and the like.

Further, as illustrated in FIG. 1, the second substrate 3 is provided with a plurality of inter-substrate conductive materials 6. The plurality of inter-substrate conductive materials 6 are conductive materials for electrically coupling the first substrate 2 and the second substrate 3 to each other. The inter-substrate conductive material 6 is coupled to any external terminal 13 of the plurality of external terminals 13 via a drawn wiring line arranged at the first substrate 2, which is omitted in illustration. Thus, the constant potential Vcom is applied to the counter electrode 32.

The seal member 4 is arranged between the first substrate 2 and the second substrate 3. The seal member 4 contains a UV-curable material such as an epoxy resin. UV is an abbreviation for ultraviolet, and particularly indicates light having a wavelength from 100 nm to 400 nm. Further, the seal member 4 may contain a gap material formed of an inorganic material such as glass.

The liquid crystal layer 5 is arranged in a region surrounded by the first substrate 2, the second substrate 3, and the seal member 4. The liquid crystal layer 5 is an electro-optical layer having optical characteristics that change in accordance with an electric field. The liquid crystal layer 5 includes the liquid crystal molecules 50 with positive or negative dielectric anistropy. Alignment of the liquid crystal molecules 50 changes in accordance with a voltage applied to the liquid crystal layer 5.

As illustrated in FIG. 1, the electro-optical device 100 includes a display region A10 for displaying image and a peripheral region A20 provided outside of the display region A10 in plan view. A plurality of pixels P arranged in a matrix are provided in the display region A10. The plurality of pixel electrodes 24 are arranged correspondingly to the plurality of pixels P in a one-to-one manner. Thus, the plurality of pixel electrodes 24 are arranged in a matrix. Meanwhile, the counter electrode 32 described above is provided commonly for the plurality of pixels P. The counter electrode 32 is provided in the display region A10.

The peripheral region A20 is a frame that surrounds the display region A10 in plan view. The peripheral region A20 includes a dummy pixel region A21, a peripheral electrode region A22, an intermediate region A23, and a seal region A24. A plan shape of each of the regions is a frame-like shape. The plurality of dummy pixel electrodes 24d are arranged in the dummy pixel region A21. The peripheral electrode 28 is arranged in the peripheral electrode region A22. The intermediate region A23 is a region that is provided between the peripheral electrode region A22 and the seal region A24 in plan view. The seal member 4 is provided in the seal region A24. Therefore, the seal member 4 is arranged outside of the counter electrode 32. Further, the parting 38 illustrated in FIG. 2 is arranged in the dummy pixel region A21, the peripheral electrode region A22, and the intermediate region A23. Further, the scanning line driving circuit 11, the signal line driving circuit 12, and the plurality of external terminals 13 that are illustrated in FIG. 1 are arranged in the peripheral region A20.

For example, the electro-optical device 100 described herein is applied to display devices that perform color display such as a personal computer and a smartphone, which are described later. When applied to the display device, a color filter is used for the electro-optical device 100 as necessary. Further, the electro-optical device 100 is applied to, for example, a projection-type projector to be described later. In this case, the electro-optical device 100 functions as a light valve. Note that, in this case, the color filter is omitted for the electro-optical device 100.

A-2. Electrical Configuration of First Substrate 2

Figure 3:
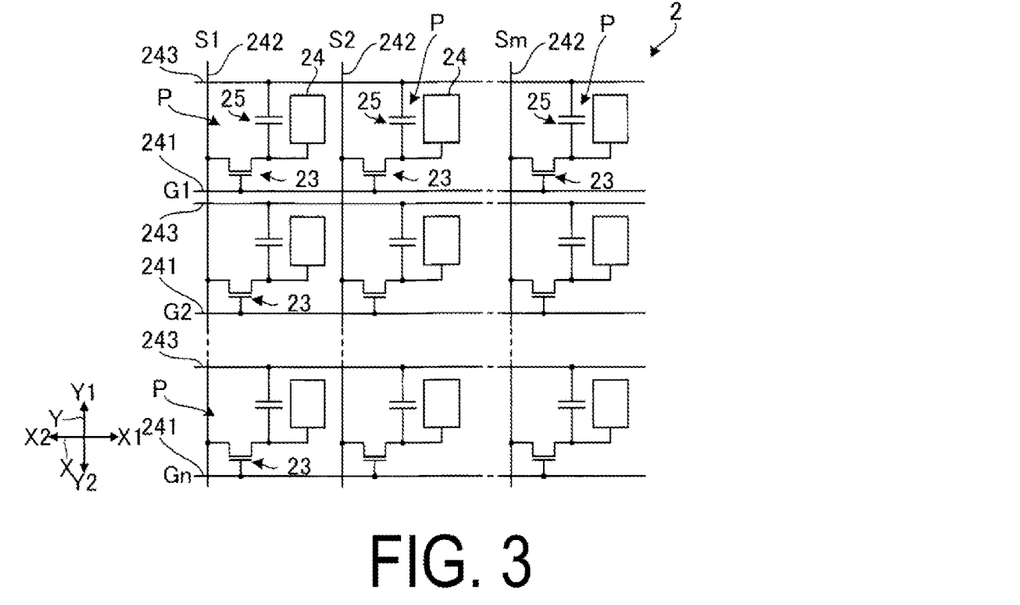
FIG. 3 is an equivalent circuit diagram illustrating an electrical configuration of a first substrate in FIG. 1.

FIG. 3 is an equivalent circuit diagram illustrating an electrical configuration of the first substrate 2 in FIG. 1. As illustrated in FIG. 3, the first substrate 2 is provided with a plurality of transistors 23, n scanning lines 241, m signal lines 242, and n constant potential lines 243. Those are provided to the first laminated body 20 in FIG. 2. Note that each of n and m is an integer equal to or greater than 2. The transistor 23 is arranged in a manner corresponding to each intersection of the n scanning lines 241 and the m signal lines 242. Each of the transistors 23 is a Thin Film Transistor (TFT) that functions as a switching element, for example. Each of the transistors 23 includes a gate, a source, and a drain.

Each of the n scanning lines 241 extends in the X1 direction, and the n scanning lines 241 are arrayed at an equal interval in the Y1 direction. The n scanning lines 241 are respectively electrically coupled to the gates of the plurality of corresponding transistors 23. The n scanning lines 241 are electrically coupled to the scanning line driving circuit 11 illustrated in FIG. 1. Scanning signals G1, G2, . . . , and Gn are line-sequentially supplied to one to n scanning lines 241 from the scanning line driving circuit 11.

Each of the m signal lines 242 illustrated in FIG. 3 extends in the Y1 direction, and the m signal lines 242 are arrayed at an equal interval in the X1 direction. The m signal lines 242 are respectively electrically coupled to the sources of the plurality of corresponding transistors 23. The m signal lines 242 are electrically coupled to the signal line driving circuit 12 illustrated in FIG. 1. Image signals S1, S2, . . . , and Sm are supplied in parallel to one to m signal lines 242 from the signal line driving circuit 12.

The n scanning lines 241 and the m signal lines 242 illustrated in FIG. 3 are electrically insulated from each other, and arranged in a grid form in plan view. A region surrounded by adjacent two scanning lines 241 and adjacent two signal lines 242 corresponds to the pixel P. The transistor 23, the pixel electrode 24, and a storage capacitor 25 is provided to each of the pixels P. The pixel electrode 24 is provided to the transistor 23 in a one-to-one manner. Each of the pixel electrodes 24 is electrically coupled to the drain of the corresponding transistor 23.

Each of the n constant potential lines 243 extends in the X1 direction, and the n constant potential lines 243 are arrayed at an equal interval in the Y1 direction. Further, the n constant potential lines 243 are electrically insulated from the n scanning lines 241 and the m signal lines 242, and arranged with a space therebetween. The constant potential Vcom is applied to each of the constant potential lines 243.

Each of the n constant potential lines 243 is electrically coupled to one of two electrodes of the corresponding storage capacitor 25. Each of the storage capacitors 25 is a retention capacitor for storing a potential of the pixel electrode 24. The storage capacitor 25 is provided to the transistor 23 in a one-to-one manner. Further, the other of the two electrodes of each of the storage capacitors 25 is electrically coupled to the corresponding pixel electrode 24. Therefore, the constant potential Vcom is applied to one electrode of the storage capacitor 25, and the other electrode is electrically coupled to the drain of the transistor 23.

When the scanning signals G1, G2, . . . , and Gn sequentially become active, and the n scanning lines 241 are sequentially selected, the transistor 23 coupled to the selected scanning line 241 is turned on. Then, the potential corresponding to the image signals S1, S2, . . . , and Sm with values corresponding to the gradation to be displayed via the m signal lines 242 is applied to the pixel electrode 24 of the pixel P corresponding to the selected scanning line 241. With this, the voltage corresponding to the gradation to be displayed is applied to the liquid crystal capacitance formed between the pixel electrode 24 and the counter electrode 32, and alignment of the liquid crystal molecules 50 changes in accordance with the applied voltage. Further, a voltage to be applied is maintained by the storage capacitor 25. Such a change of the alignment of the liquid crystal molecules modulates the light, and achieves gradation display.

1C. Second Substrate 3

Figure 4:
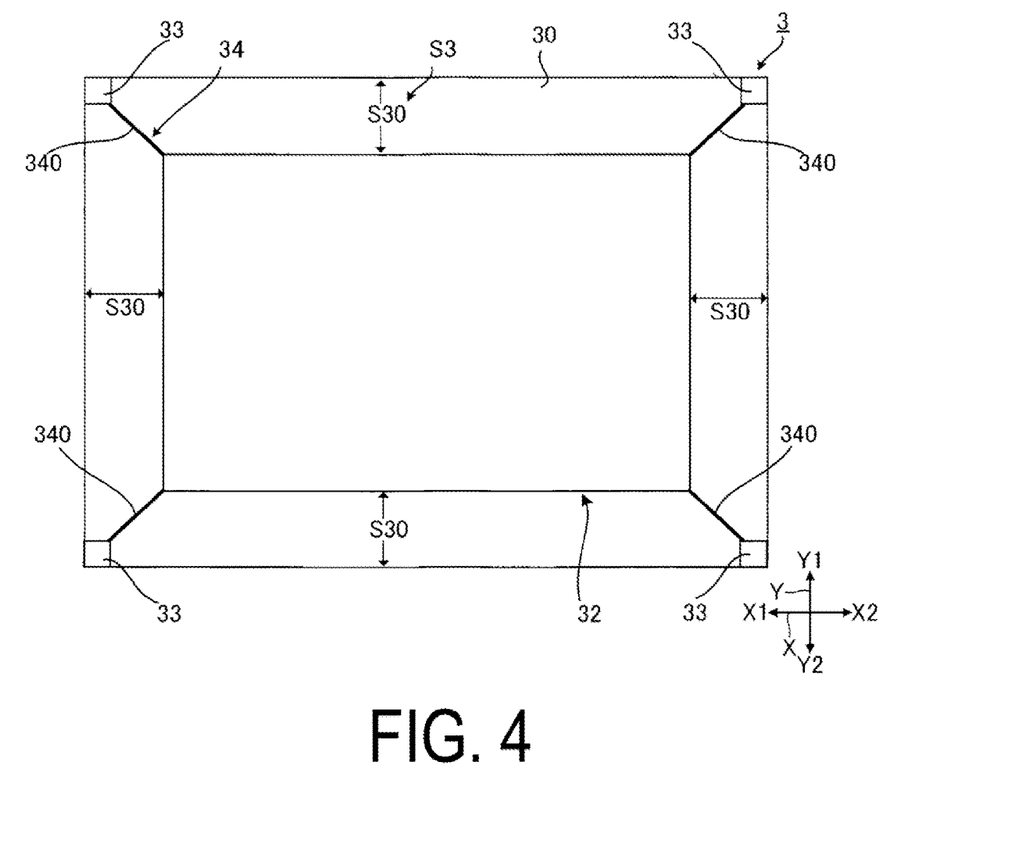
FIG. 4 is a plan view illustrating a second substrate in FIG. 2.

FIG. 4 is a plan view illustrating the second substrate 3 in FIG. 2. FIG. 4 is a plan view of the second substrate 3 as viewed in the Z1 direction. In FIG. 4, illustration of the second alignment film 39 is omitted. The second substrate 3 includes the counter electrode 32, the plurality of electrodes 33, and the conductive portion 34. Further, the second substrate 3 includes a non-conductive region S3.

A plan shape of the counter electrode 32 is a rectangular shape similarly to the second substrate 3 in plan view. Note that, similarly, a plan shape of each of the substrate 31 and the second laminated body 30 described above is a rectangular shape. The plan area of the counter electrode 32 is smaller than the plan area of the second laminated body 30. The counter electrode 32 is located at the center of the second laminated body 30. Note that the plan area of the second laminated body 30 is substantially equal to the plan area of the substrate 31.

The plurality of electrodes 33 are provided to establish electrical coupling between the first substrate 2 and the second substrate 3 by the inter-substrate conductive material 6 described above. The plurality of electrodes 33 is arranged at the second laminated body 30, and is provided in the same layer as the counter electrode 32. The material of each of the electrodes 33 is the same material as the counter electrode 32. In the present exemplary embodiment, as the plurality of electrodes 33, four electrodes 33 are provided. The four electrodes 33 are provided to the corners of the second laminated body 30, respectively. Note that a plan shape of each of the electrodes 33 is a rectangular shape, but may be a different shape such as a circular shape.

The conductive portion 34 includes a plurality of conductive lines 340. Each of the conductive lines 340 is a wiring line that has conductivity and couples the counter electrode 32 and the plurality of electrodes 33 to each other. The conductive portion 34 is arranged at the second laminated body 30, and is provided in the same layer as the counter electrode 32. The material of the conductive portion 34 is the same material as the counter electrode 32. The conductive portion 34, the plurality of electrodes 33, and the counter electrode 32 are collectively formed by subjecting a metal film to etching, for example. Further, in the present exemplary embodiment, the plurality of conductive portions 34 include four conductive lines 340, but may include one, two, three, five, or more conductive lines 340. Each of the conductive lines 340 has a linear shape in plan view, but may be curved.

The non-conductive region S3 is a region that is not provided with the counter electrode 32, the plurality of electrodes 33, and the conductive portion 34. The non-conductive region S3 is arranged outside the counter electrode 32. In addition, the non-conductive region S3 is a region that is not provided with other films having conductivity. Examples of the film having conductivity include various electrodes including electrodes and the like formed of a transparent conductive material, various wiring lines, and the like. In the present exemplary embodiment, as the non-conductive region S3, four non-conductive portions S30 are provided. Each of the non-conductive portions S30 is provided between two conductive lines 340. The non-conductive region S3 has a frame-like shape surrounding the counter electrode 32 in plan view, except for the conductive portion 34. The non-conductive region S3 is provided with the seal member 4. Further, the non-conductive region S3 is a wavelength opening portion through which UV light arrives at the seal member 4. In other words, the non-conductive region S3 is a region that easily transmits UV light as compared to the other regions. Thus, UV light easily arrives at the seal member 4.

Figure 5:
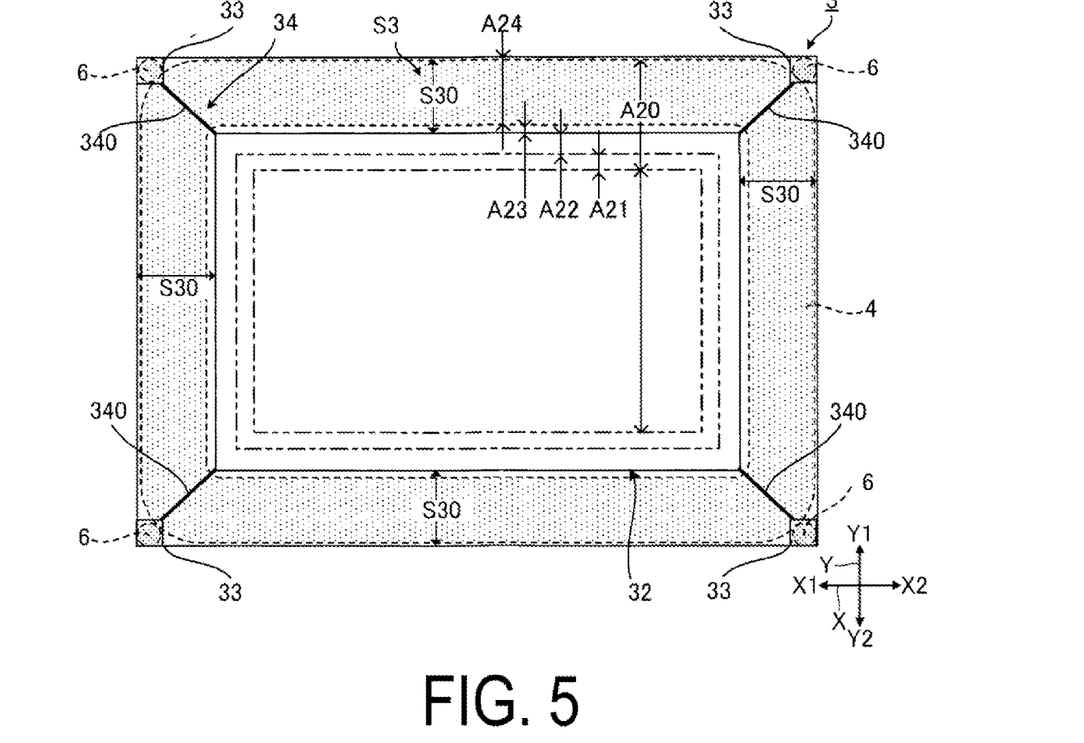
FIG. 5 is a plan view illustrating the second substrate and a seal material in FIG. 2.

FIG. 5 is a plan view illustrating the second substrate 3 and the seal member 4 in FIG. 2. FIG. 5 is a plan view in which the second substrate 3 and the seal member 4 are viewed in the Z1 direction. In FIG. 5, illustration of the second alignment film 39 is omitted.

As illustrated in FIG. 5, the plurality of electrodes 33, the conductive portion 34, and the non-conductive region S3 is provided in the peripheral region A20. In particular, the conductive portion 34 and the non-conductive region S3 are provided in the seal region A24, and the plurality of electrodes 33 is provided outside of the seal region A24 in plan view. Therefore, the conductive portion 34 and the non-conductive region S3 overlap with the seal member 4 in plan view, and the plurality of electrodes 33 is provided outside of the seal member 4 in plan view. Further, the conductive portion 34 protrudes in the Z1 direction from the second laminated body 30. Thus, the seal member 4 has protrusions and recesses due to the conductive portion 34.

Figure 6:
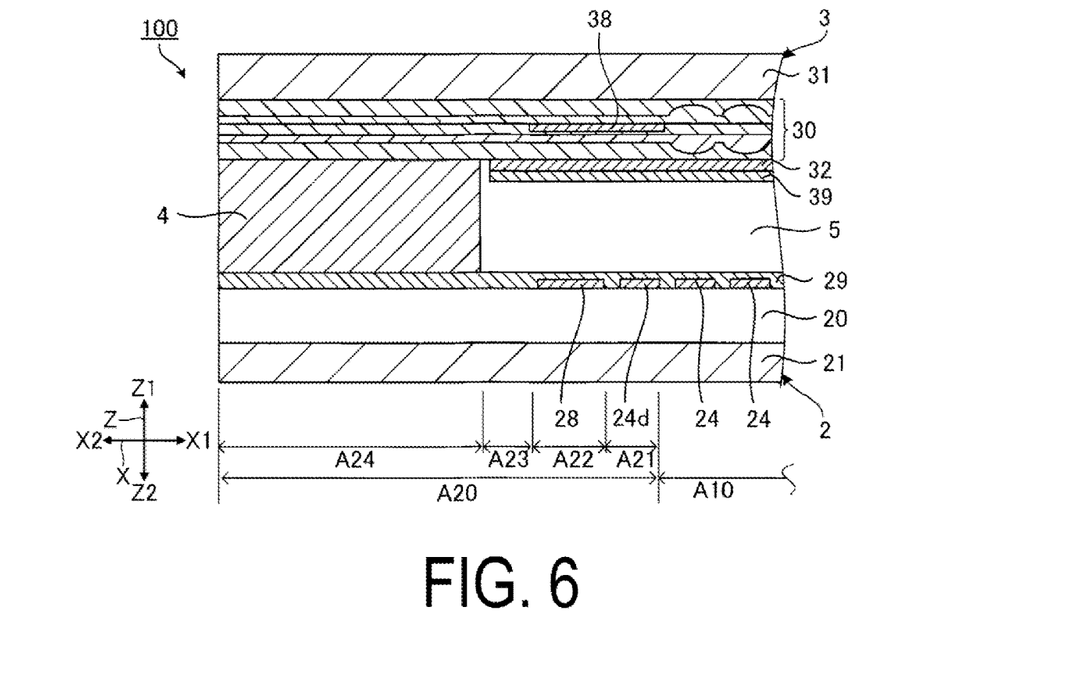
FIG. 6 is a view illustrating a part of the electro-optical device in FIG. 2.

FIG. 6 is a view illustrating a part of the electro-optical device 100 in FIG. 2. As illustrated in FIG. 6, the seal member 4 contacts with each of the first alignment film 29 and the second laminated body 30. The seal member 4 does not contact with the counter electrode 32 and the second alignment film 39. Further, the seal member 4 is arranged at a position that is away from the counter electrode 32 and is different from the counter electrode 32 and the second alignment film 39 in plan view. The seal member 4 does not contact with the counter electrode 32 and the second alignment film 39. Further, the non-conductive region S3 is arranged outside of the counter electrode 32 and the second alignment film 39.

Figure 7:
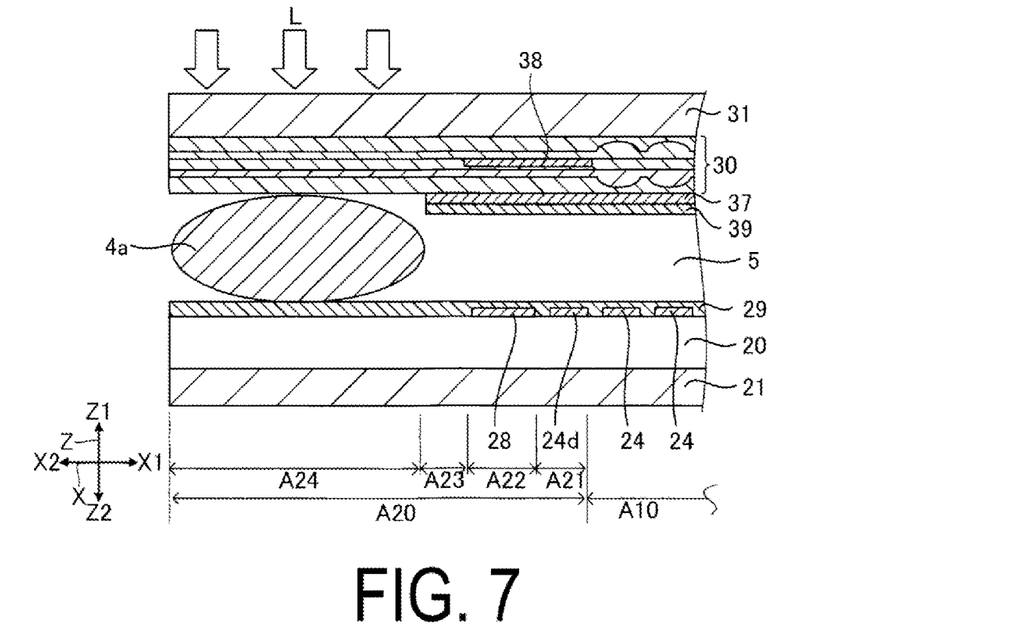
FIG. 7 is a view for describing a method of forming a seal member illustrated in FIG. 6.

FIG. 7 is a diagram for describing a method of forming the seal member 4 illustrated in FIG. 6. A seal base material 4a illustrated in FIG. 7 is a base material of the seal member 4 illustrated in FIG. 6, and contains a UV curing resin before curing. As illustrated in FIG. 7, the seal base material 4a is arranged between the first substrate 2 and the second substrate 3. The seal base material 4a is arranged outside of the counter electrode 32 in the peripheral region A20 in plan view, in other words, in the seal region A24. Then, the seal region A24 is irradiated with light L in the Z2 direction from the outer surface of the second substrate 3. The seal base material 4a is cured by irradiating the seal member 4 with the light L to become the seal member 4. As a result, the first substrate 2 and the second substrate 3 are bonded to each other via the seal member 4.

The light L is light having a wavelength region from 10 nm to 400 nm. For example, a transmittance at 380 nm in the non-conductive region S3 may be 70% or greater, and may also be 80% or greater.

As described above, the second substrate 3 includes the non-conductive region S3. The non-conductive region S3 overlaps with the seal member 4 in plan view, is provided in the same layer as the counter electrode 32, and is not provided with the conductive portion 34 and other films having conductivity. The non-conductive region S3 described herein is provided in the seal region A24. With this, the irradiation time for curing the seal base material 4a with the light L can be reduced. Thus, degradation of productivity can be suppressed. In addition, the irradiation time with the light L can be reduced. Thus, an increase of contaminants in the liquid crystal layer 5, which is caused by a temperature rise of the first substrate 2 and the second substrate 3 due to irradiation with the light L, can be suppressed. For example, components contained in the seal base material 4a can be prevented from entering the liquid crystal layer 5 as contaminants in the liquid crystal layer 5. Thus, display stains can be suppressed. As a result, degradation of display quality can be suppressed.

Note that the film having conductivity has a transmittance of the light L that is lower than that of the second laminated body 30. Thus, a transmittance of the light L in the non-conductive region S3 is higher than a transmittance of the light L in a portion provided with the conductive portion 34 in plan view. Further, a transmittance of the light L in the non-conductive region S3 is higher than that in a region provided with the counter electrode 32, in other words, the display region A10. Therefore, the irradiation time with the light L for curing the seal base material 4a can be reduced by providing the plurality of non-conductive regions S3 in the seal region A24.

In order to exert an effect of providing the non-conductive region S3 in a particularly suitable way, a transmittance of the light L in the non-conductive region S3 of the second substrate 3 may be 70% or greater, and may also be 80% or greater.

Figure 15:
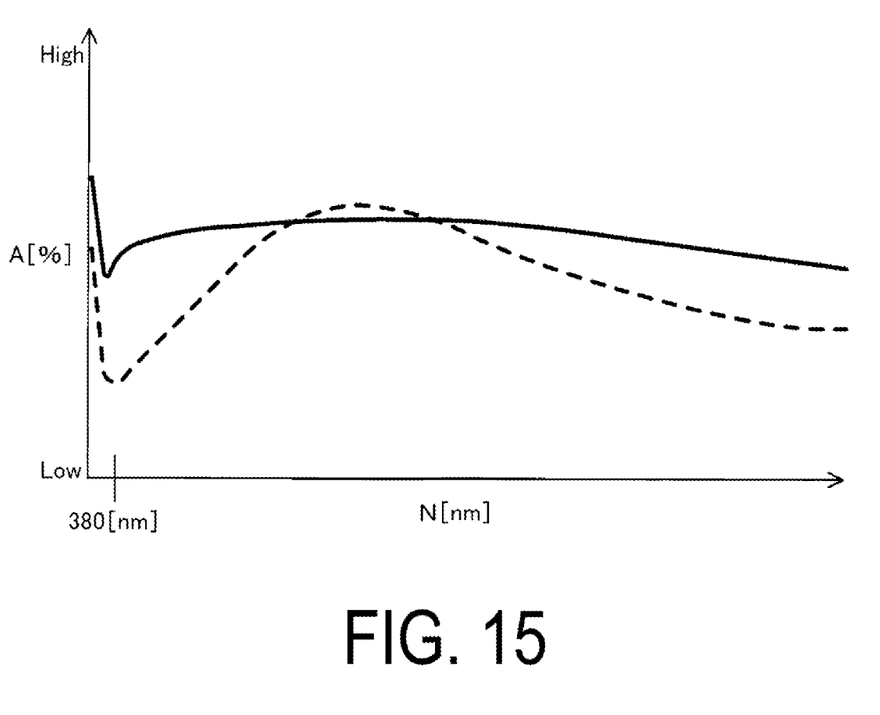
FIG. 15 is a graph for describing a transmittance in a seal region.

FIG. 15 is a graph for describing a transmittance A in the seal region A24. In FIG. 15, the transmittance A in the non-conductive region S3 of the seal region A24 is indicated with the solid line, and the transmittance A in a case in which the seal region A24 is provided with a thin ITO film is indicated with the broken line. The thickness of the thin ITO film is 20 nm, for example. The vertical axis in FIG. 15 indicates the transmittance A [%]. The horizontal axis in FIG. 15 indicates a wavelength N [nm], and the wavelength is higher as approaching the right side in the drawing. As apparent from FIG. 15, the transmittance A in the non-conductive region S3 that is not provided with an ITO film is greater than the transmittance A in a case in which the ITO film is provided. Note that, with regard to UV light other than the light L at a wavelength of 380 nm, the transmittance A in the non-conductive region S3 that is not provided with an ITO film is similarly greater than the transmittance A in a case in which the ITO film is provided.

Further, a coverage rate of the non-conductive region S3 in the peripheral region A20 is greater than a coverage rate of the conductive portion 34. Thus, the time for curing the seal member 4 can be reduced as compared to a case in which a coverage rate of the non-conductive region S3 is equal to or less than a coverage rate of the conductive portion 34. Note that, even when a coverage rate of the non-conductive region S3 is equal to or greater than a coverage rate of the conductive portion 34, the time for curing the seal member 4 can be reduced as compared to a case in which the non-conductive region S3 is not provided.

The coverage rate is an area coverage rate within a plan shape, and is an area coverage rate of a peripheral area in a plan area. A coverage area rate [%] is an area rate in the peripheral region A20, and is obtained by "an area of the non-conductive region S3/an area of the peripheral region A20: an area of the conductive portion 34/a peripheral region area".

A coverage rate of the non-conductive region S3 in the peripheral region A20 may be 90% or greater and less than 100%, may be 95% or greater and less than 100%, and may also be 98% or greater and less than 100%. When the value is equal to or greater than the lower limited value described herein, the time for curing the seal member 4 can be reduced significantly as compared to a case in which the value is less than the lower limit value.

Further, as described above, the non-conductive region S3 is provided to the second substrate 3. The first substrate 2 is provided with the scanning line driving circuit 11 and the signal line driving circuit 12 in the peripheral region A20. In contrast, the second substrate 3 is not provided with the scanning line driving circuit 11 and the signal line driving circuit 12 in the peripheral region A20. Thus, as compared to the first substrate 2, a coverage rate of the non-conductive region S3 in the peripheral region A20 can be increased easily in the second substrate 3. Thus, when the non-conductive region S3 is provide to the second substrate 3, a degree of freedom in arrangement of the scanning line driving circuit 11 and the signal line driving circuit 12 can be increased, and the time for curing the seal member 4 can be reduced.

Note that the non-conductive region S3 and the conductive portion 34 may be provided to the first substrate 2. In such a case, the first substrate 2 corresponds to "one substrate", and the second substrate 3 corresponds to "another substrate". In such a case, arrangement of the scanning line driving circuit 11 and the signal line driving circuit 12 is devised so that a coverage rate of the non-conductive region S3 in the peripheral region A20 is increased. For example, the scanning line driving circuit 11 and the signal line driving circuit 12 are prevented from overlapping with the seal region A24.

Further, as described above, the second substrate 3 is provided with the conductive portion 34. Each of the conductive lines 340 of the conductive portion 34 is a coupling wiring line that electrically couples the counter electrode 32 and the inter-substrate conductive material 6 to each other. Further, in the present exemplary embodiment, in the seal region A24, an entire region other than each of the conductive lines 340 functioning as a coupling wiring line is regarded as the non-conductive region S3. Thus, the time for curing the seal member 4 can be reduced significantly.

Further, although not particularly limited, the width of each of the conductive lines 340 is from 5 μm to 10 μm, for example. With this, breakage is less likely to occur in each of the conductive lines 340, and a coverage rate of the non-conductive region S3 is increased.

As described above, similarly to the related-art configuration, in the electro-optical device 100, a part of the counter electrode 32 does not overlap with the seal member 4 in the seal region A24 in plan view. Thus, the time for curing the seal member 4 can be reduced. In addition, in the related-art configuration, a part of the counter electrode 32 is required to be provided in the seal region A24 so that the counter electrode 32 and the inter-substrate conductive material 6 are electrically coupled to each other. In contrast, in the electro-optical device 100, the conductive portion 34 is provided. With this, electrical coupling between the counter electrode 32 and the inter-substrate conductive material 6 can be secured, and the entire region of the seal region A24 other than the conductive portion 34 can be used as the non-conductive region S3. Thus, the time for curing the seal member 4 can be reduced as compared to the configuration in the related art.

B. Second Exemplary Embodiment

A second exemplary embodiment is described. Note that, in each of the following examples, the elements having functions similar to those in the first exemplary embodiment are denoted with the same reference symbols used in the description of the first exemplary embodiment, and detail description for each element is omitted as appropriate.

Figure 8:
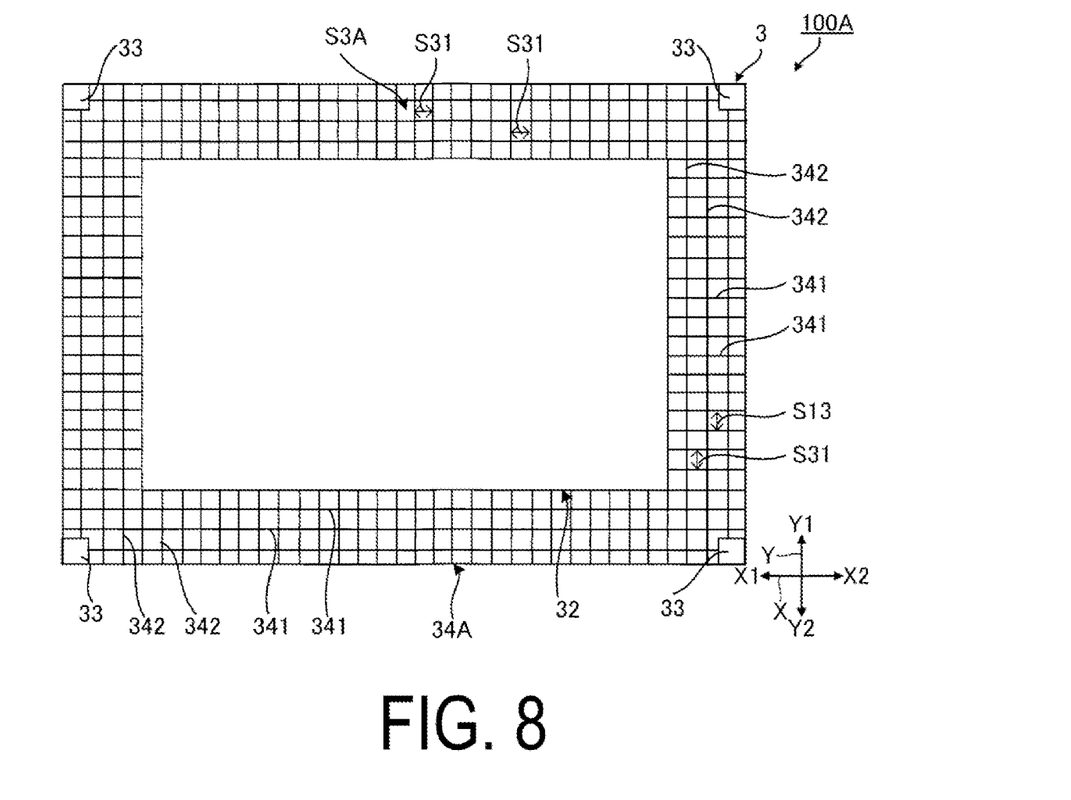
FIG. 8 is a plan view illustrating a conductive portion of an electro-optical device according to a second exemplary embodiment.

FIG. 8 is a plan view illustrating a conductive portion 34A of an electro-optical device 100A of the second exemplary embodiment. The electro-optical device 100A of the present exemplary embodiment is different from the electro-optical device 100 of the first exemplary embodiment in that the conductive portion 34A is provided in place of the conductive portion 34 of the first exemplary embodiment and a non-conductive region S3A is provided in place of the non-conductive region S3.

As illustrated in FIG. 8, the conductive portion 34A has a mesh-like shape in plan view. The conductive portion 34A includes a plurality of first conductive lines 341 and a plurality of second conductive lines 342. Each of the plurality of first conductive lines 341 and the plurality of second conductive lines 342 is a coupling wiring line that electrically couples the counter electrode 32 and the inter-substrate conductive material 6 to each other. The plurality of first conductive lines 341 and the plurality of second conductive lines 342 intersect with each other, and are arranged in a matrix. The plurality of first conductive lines 341 are away from each other, and extend in the X1 direction. The plurality of second conductive lines 342 are away from each other, and extend in the Y1 direction. The conductive portion 34A described herein is coupled to four electrodes 33. Further, the conductive portion 34A protrudes in the Z1 direction from the second laminated body 30. Thus, although not illustrated in detail, the seal member 4 includes a plurality of protrusions and recesses due to the conductive portion 34A.

The non-conductive region S3A is a region that is not provided with a film having conductivity. The non-conductive region S3A includes a plurality of opening portions S31. The plurality of opening portions S31 are away from each other in plan view, and are arranged in a matrix in the seal region A24. The plurality of opening portions S31 are regions between the plurality of first conductive lines 341 and the plurality of second conductive lines 342.

When the conductive portion 34A has a mesh-like shape in a plan shape, the degree of protrusions and recesses of the seal member 4 on the second laminated body 30, which is caused by the conductive portion 34A, can be dispersed, and distribution of the degree of protrusions and recesses of the seal member 4 can be uniformized. Thus, as compared to the first exemplary embodiment, uniformity of the seal member 4 arranged at the second laminated body 30 and the conductive portion 34A can be improved. Thus, as compared to the first exemplary embodiment, uniformity of the distance between the first substrate 2 and the second substrate 3 can be improved. In other words, cell gap uniformity can be improved.

In the present exemplary embodiment, an opening rate of the mesh of the conductive portion 34A, in other words, a coverage rate of the non-conductive region S3 in the peripheral region A20 may be 50% or greater and less than 100%, may be 60% or greater and less than 100%, and may also be 80% or greater and less than 100%. When the value is equal to or greater than the lower limited value described herein, the conductive portion 34A having a mesh-like shape can be formed easily, and the time for curing the seal member 4 can be reduced significantly as compared to a case in which the value is less than the lower limit value.

The coverage rate is an area coverage rate within a plan shape, and is an area coverage rate of a peripheral area in a plan area. A coverage area rate [%] is an area rate in the peripheral region A20, and is obtained by "an area of the non-conductive region S3A/an area of the peripheral region A20: an area of the conductive portion 34A/a peripheral region area". In particular, in the present exemplary embodiment, the non-conductive region S3A includes the plurality of opening portions S31 between the plurality of first conductive lines 341 and the plurality of second conductive lines 342. A total of area coverage rates of the plurality of opening portions S31 in the plan area of the peripheral region A20 corresponds to a coverage rate of the non-conductive region S3A.

Similarly to the first exemplary embodiment, the second exemplary embodiment described above enables significant reduction in time for curing the seal member 4 as compared to the related art.

Further, in the present exemplary embodiment, the conductive portion 34A has a mesh-like shape in plan view. However, the conductive portion 34A may have a shape other than a mesh-like shape as long as the degree of protrusions and recesses of the seal member 4 can be uniformized. The conductive portion 34A may have a honeycomb structure, for example. Further, in the conductive portion 34A, each of the plurality of first conductive lines 341 and the plurality of second conductive lines 342 may have a curved shape.

C. Third Exemplary Embodiment

A third exemplary embodiment is described. Note that, in each of the following examples, the elements having functions similar to those in the first exemplary embodiment are denoted with the same reference symbols used in the description of the first exemplary embodiment, and detail description for each element is omitted as appropriate.

Figure 9:
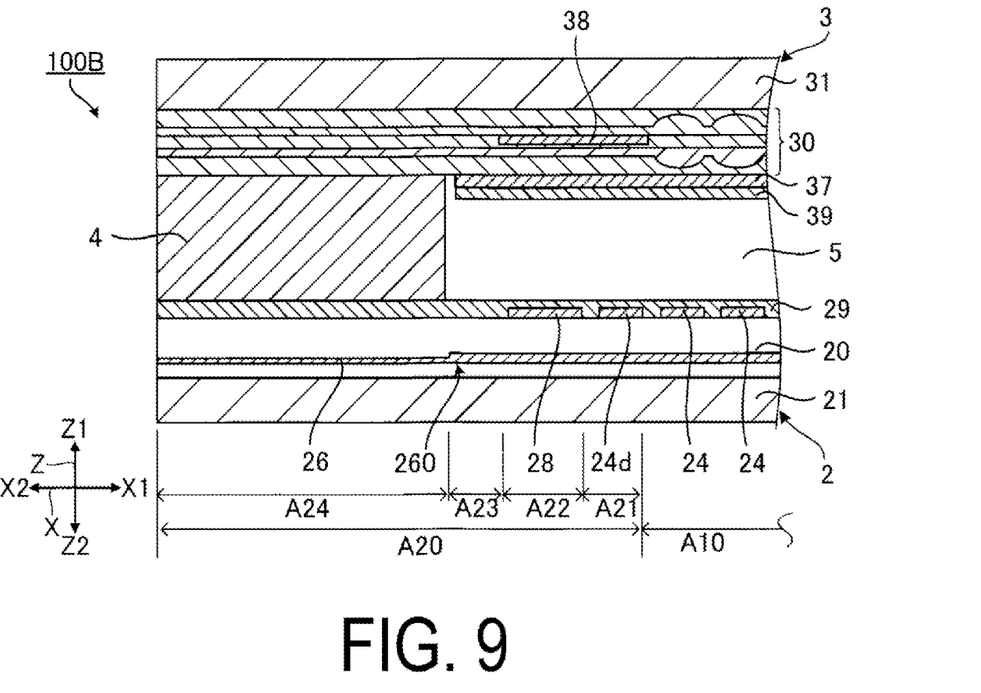
FIG. 9 is a cross-sectional view illustrating a part of an electro-optical device of a third exemplary embodiment.

FIG. 9 is a cross-sectional view illustrating a part of an electro-optical device 100B of a fourth exemplary embodiment. The present exemplary embodiment is different from the first exemplary embodiment in that the first substrate 2 includes a reflection film 26.

As illustrated in FIG. 9, the first substrate 2 of the present exemplary embodiment includes the reflection film 26. The reflection film 26 has reflectivity with respect to the light L.

The reflection film 26 is provided to the second laminated body 30. For example, as the reflection film 26, a part of a wiring line 260 provided to the first substrate 2 may be used. For example, the wiring line 260 is configured by a laminated body including an aluminum film and a titanium nitride film. The titanium nitride film is provided absorb the incident light LL to avoid reflection of the incident light LL. In such a case, a part of the titanium nitride film is removed from a portion of the wiring line 260 that is provided in the seal region A24 so that only the aluminum film is left. With this, a part of the wiring line 260 may be used as the reflection film 26. Thus, there is no need to provide the reflection film 26 additionally.

When the first substrate 2 is provided with the reflection film 26, the light L incident through the second substrate 3 can be reflected by the reflection film. Thus, with the reflected light that is reflected by the reflection film 26, the seal member 4 can be cured from the side close to the first substrate 2. Thus, the seal member 4 can be cured with the light L from the side close to the second substrate 3. At the same time, the seal member 4 can also be cured with the reflected light from the side close to the first substrate 2. Thus, when the reflection film 26 is provided, the time for curing the seal member 4 can be reduced as compared to a case in which the reflection film 26 is not provided.

In order to effectively demonstrate the function as the reflection film 26, a transmittance of the light L through the reflection film 26 may be 70% or greater, and may also be 80% or greater.

Note that, when the first substrate 2 is provided with the non-conductive region S3, and the light L is radiated in the Z1 direction from the first substrate 2, a "reflection film" may be provided to the second substrate 3. Further, the reflection film 26 may be provided separately from the wiring line 260, instead pf a part of the wiring line 260.

Similarly to the first exemplary embodiment, the third exemplary embodiment described above enables significant reduction in time for curing the seal member 4 as compared to the related art.

D. Fourth Exemplary Embodiment

A fourth exemplary embodiment is described. Note that, in each of the following examples, the elements having functions similar to those in the first exemplary embodiment are denoted with the same reference symbols used in the description of the first exemplary embodiment, and detail description for each element is omitted as appropriate.

Figure 10:
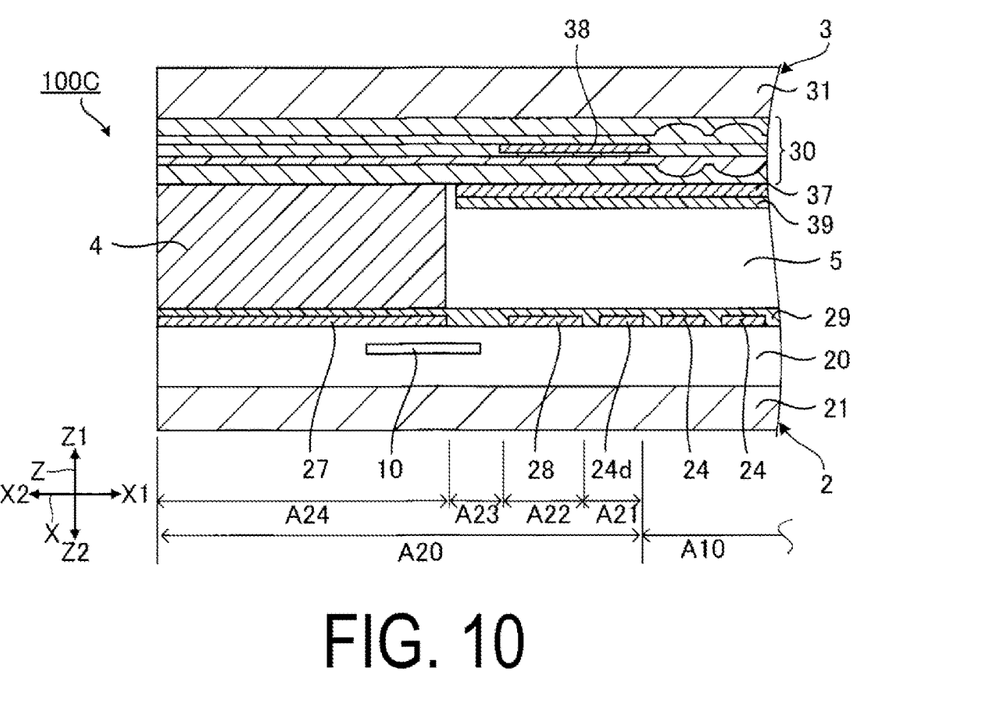
FIG. 10 is a cross-sectional view illustrating a part of an electro-optical device of a fourth exemplary embodiment.

FIG. 10 is a cross-sectional view of an electro-optical device 100C of a fourth exemplary embodiment. The present exemplary embodiment is different from the first exemplary embodiment in that the first substrate 2 includes the absorption film 27.

As illustrated in FIG. 10, the first substrate 2 of the present exemplary embodiment includes the absorption film 27. The absorption film 27 has a function of absorbing the light L. The absorption film 27 is provided in the same layer as the plurality of pixel electrodes 24 at the second laminated body 30. For example, the material of the absorption film 27 is a transparent conductive material, which is the same as the plurality of pixel electrodes 24. The absorption film 27 and the plurality of pixel electrodes 24 are collectively formed by subjecting a transparent conductive film to etching, for example.

The first substrate 2 includes the absorption film 27. Thus, the light L incident through the second substrate 3 can be absorbed by the absorption film 27. In addition, the absorption film 27 is closer to the seal member 4 than the driving circuit 10. For example, when the absorption film 27 is arranged closer to the seal member 4 than the driving circuit 10, the light L passing through the seal member 4 can be prevented from arriving at the driving circuit 10. Therefore, the absorption film 27 functions as a protective film that protects the driving circuit 10 from UV irradiation. Thus, when the absorption film 27 is provided, degradation of each of the elements of the driving circuit 10 due to UV irradiation can be suppressed.

Note that the absorption film 27 may function as a protective film that protects elements other than the driving circuit 10. Further, the absorption film 27 may not be arranged at the first laminated body 20, and may be arranged inside the first laminated body 20. Further, when the first substrate 2 is provided with the non-conductive region S3, and irradiation with the light L is performed in the Z1 direction from the first substrate 2, the second substrate 3 may be provided with an "absorption film".

In order to effectively demonstrate the function as the absorption film 27, an absorptance of the light L by the absorption film 27 may be 50% or greater. An absorptance [%] is obtained by (100-transmittance [%]-reflectance [%]).

Similarly to the first exemplary embodiment, the fourth exemplary embodiment described above enables significant reduction in time for curing the seal member 4 as compared to the related art.

E. Modification Example

The exemplary embodiments described above may be modified in various manners. Aspects of specific modifications applicable to the above-described exemplary embodiments are described below.

Figure 11:
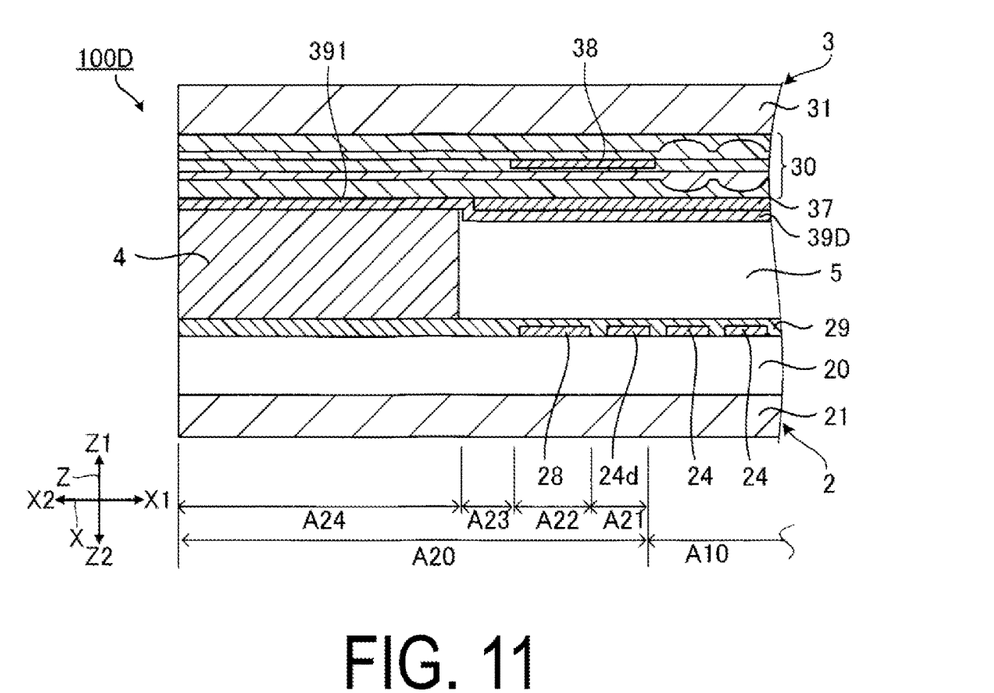
FIG. 11 is a cross-sectional view of an electro-optical device in a modification example.

FIG. 11 is a cross-sectional view of an electro-optical device 100D in a modification example. A second alignment film 39D of the electro-optical device 100D illustrated in FIG. 11 includes an extending portion 391. The extending portion 391 is a portion of the second alignment film 39D that is arranged between the seal member 4 and the second laminated body 30. The extending portion 391 extends outward from the counter electrode 32.

As illustrated in FIG. 11, the second laminated body 30 and the seal member 4 may not directly contact with each other, and the second alignment film 39D may be interposed between the second laminated body 30 and the seal member 4. Further, a film other than the second alignment film 39D may be interposed. However, when a film such as the second alignment film 39 is not interposed, a transmittance of the light L through the second substrate 3 in the seal region A24 can be increased more.

The driving type of the "electro-optical device" is not limited to a vertical electric field type, and may be a horizontal electric field type. Note that examples of the horizontal electric field type include an in-plane switching (IPS) mode. Further, examples of the vertical electric field type include a twisted nematic (TN) mode, a vertical alignment (VA), a PVA mode, and an optically compensated bend (OCB) mode.

In each of the exemplary embodiments described above, the electro-optical device 100 of an active matrix type is described. However, the driving type of the electro-optical device 100 is not limited thereto, and may be a passive matrix type or the like.

Further, the liquid crystal display device is described above as an example of the "electro-optical device" in the description given above. However, the "electro-optical device" is not limited thereto. For example, the "electro-optical device" may be applied to an image sensor or the like.

2. Electronic Apparatus

The electro-optical device 100 may be used for various electronic apparatuses.

Figure 12:
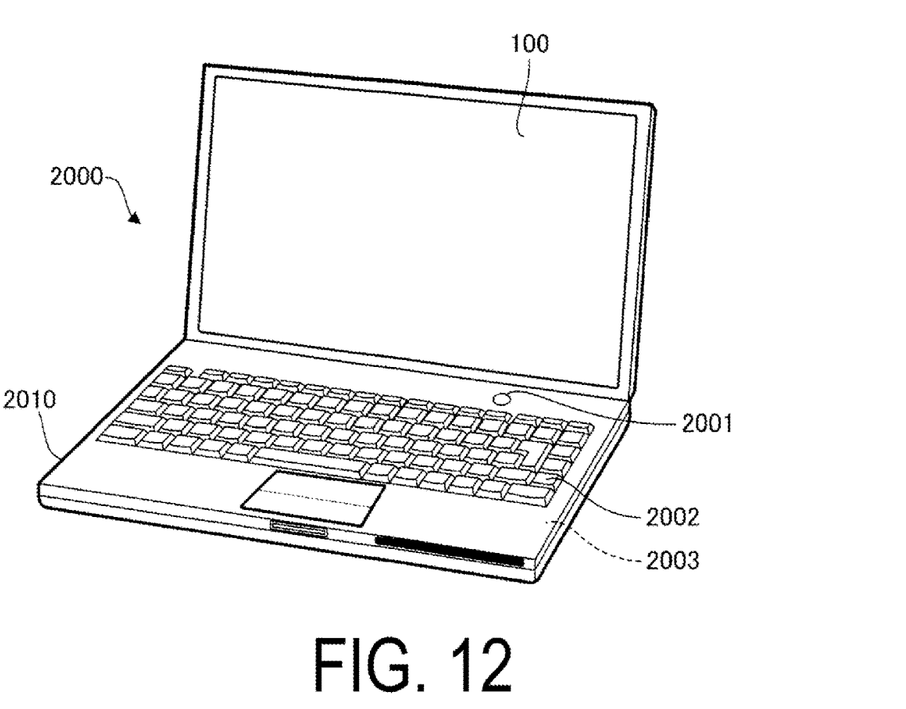
FIG. 12 is a perspective view illustrating a personal computer as an example of an electronic apparatus.

FIG. 12 is a perspective view illustrating a personal computer 2000 as an example of an electronic apparatus. The personal computer 2000 includes the electro-optical device 100 that displays various images, a main body part 2010 where a power switch 2001 and a keyboard 2002 are installed, and a control unit 2003. The control unit 2003 includes a processor and a memory, and controls the operation of the electro-optical device 100, for example.

Figure 13:
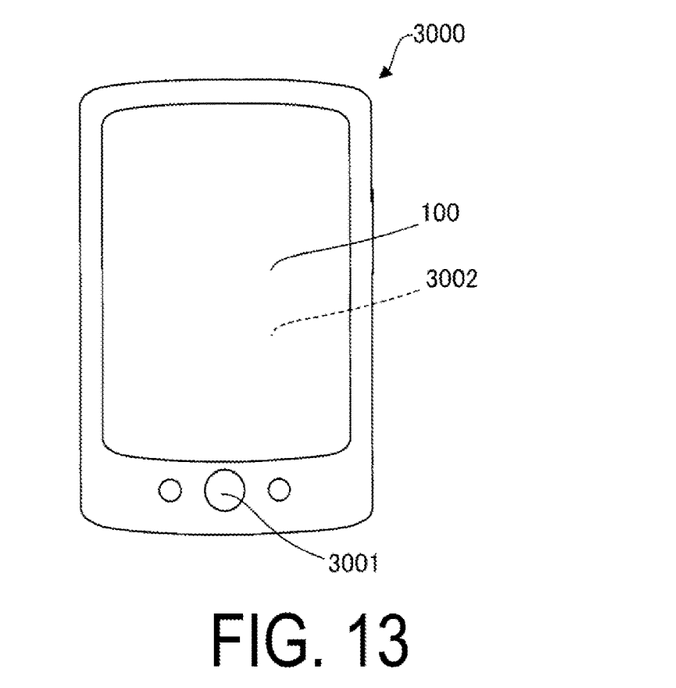
FIG. 13 is a plan view illustrating a smartphone as an example of the electronic apparatus.

FIG. 13 is a plan view illustrating a smartphone 3000 as an example of the electronic apparatus. The smartphone 3000 includes an operation button 3001, the electro-optical device 100 that displays various images, and a control unit 3002. The screen content displayed on the electro-optical device 100 is changed in accordance with the operation of the operation button 3001. The control unit 3002 includes a processor and a memory, and controls the operation of the electro-optical device 100, for example.

Figure 14:
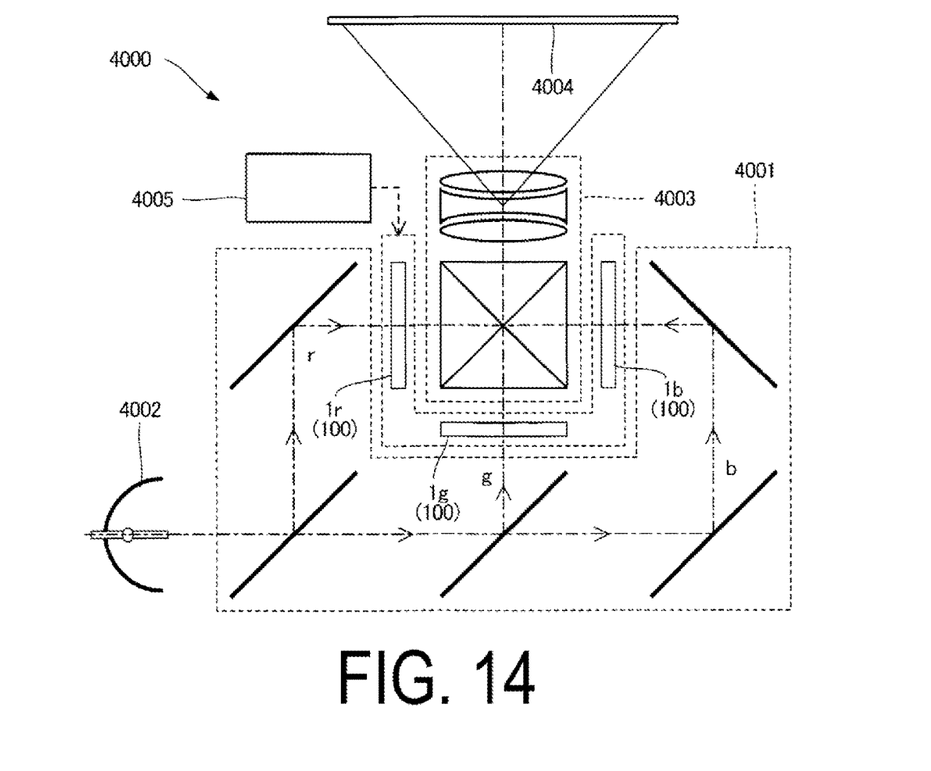
FIG. 14 is a schematic view illustrating a projector as an example of the electronic apparatus.

FIG. 14 is a schematic view illustrating a projector as an example of the electronic apparatus. A projection-type display device 4000 is a projector of a three plate type, for example. An electro-optical device 1r is the electro-optical device 100 corresponding to the red display color, an electro-optical device 1g is the electro-optical device 100 corresponding to the green display color, and an electro-optical device 1b is the electro-optical device 100 corresponding to the blue display color. That is, the projection-type display device 4000 includes the three electro-optical devices 1r, 1g and 1b corresponding to the red, green, and blue display colors, respectively. A control unit 4005 includes a processor and a memory, and controls the operation of the electro-optical device 100, for example.

Of light emitted from an illumination apparatus 4002 serving as the light source, the illumination optical system 4001 supplies a red component r to the electro-optical device 1r, a green component g to the electro-optical device 1g, and a blue component b to the electro-optical device 1b. Each of the electro-optical devices 1r, 1g and 1b functions as a light modulator such as a light valve that modulates the respective monochromatic light supplied from the illumination optical system 4001 in accordance with the display image. A projection optical system 4003 combines and projects the light emitted from each of the electro-optical devices 1r, 1g and 1b to a projection surface 4004.

The above-described electronic apparatus includes the electro-optical device 100 describes above, and the control units 2003, 3002, or 4005. The electro-optical device 100 describes above suppresses degradation of display quality. Thus, with the electro-optical device 100, degradation of display quality of the personal computer 2000, the smartphone 3000, or the projection-type display device 4000 can be suppressed. Note that, when the electro-optical device 100A, 100B, 100C, or 100D is used in place of the electro-optical device 100, similar effects can be obtained.

Note that electronic apparatuses to which the electro-optical device of the present disclosure is applied are not limited to the exemplified apparatuses, and examples of the electronic apparatuses to which the electro-optical device of the present disclosure is applied include personal digital assistants (PDA), digital still cameras, televisions, video camcorders, car navigation systems, in-vehicle displays, electronic notebooks, electronic papers, calculators, word processors, workstations, television phones, and point-of-sale (POS) terminals. Further, examples of electronic apparatuses to which the present disclosure is applied include printers, scanners, copiers, video players, or apparatuses including a touch panel.

The present disclosure is described above based on the preferred exemplary embodiments, but the present disclosure is not limited to the above-described exemplary embodiments. Further, the configuration of each part of the present disclosure may be replaced with any configuration that exhibits functions similar to those of the above-described embodiment, and any configuration may be added.

What is claimed is:

1. An electro-optical device serving as a display device provided with a display region for displaying an image and a peripheral region provided outside the display region in plan view, the electro-optical device comprising:
    a first substrate including a plurality of pixel electrodes provided in the display region;
    a second substrate including a counter electrode facing the plurality of pixel electrodes;
    a seal member being provided in the peripheral region, being arranged between the first substrate and the second substrate, and containing a UV-curable material; and
    an electro-optical layer being arranged at the first substrate and the second substrate and having optical characteristics that change in accordance with an electric field, wherein
    the second substrate includes a non-conductive region that overlaps with the seal member in plan view, is in the same layer as the counter electrode, and is not provided with a film having conductivity,
    wherein the second substrate further includes a conductive portion overlapping with the seal member in plan view, and
    a coverage rate of the non-conductive region to the peripheral region is higher than a coverage rate of the conductive portion.

2. The electro-optical device according to claim 1, wherein
    the second substrate is provided with an inter-substrate conductive material that is arranged in the peripheral region and electrically couples the first substrate and the second substrate to each other, and
    the conductive portion includes a coupling wiring line that electrically couples the counter electrode and the inter-substrate conductive material to each other.

3. The electro-optical device according to claim 1, wherein
    a plan shape of the conductive portion is a mesh-like shape.

4. The electro-optical device according to claim 3, wherein
    the conductive portion includes a plurality of first conductive lines and a plurality of second conductive lines that intersect with each other, and
    the non-conductive region is a plurality of opening portions between the plurality of first conductive lines and the plurality of second conductive lines.

5. The electro-optical device according to claim 1, wherein
    the first substrate includes a reflection film that is arranged in the peripheral region and reflects light having a wavelength of 380 nm.

6. The electro-optical device according to claim 1, wherein
the first substrate includes an absorption film that is arranged in the peripheral region and absorbs light having a wavelength of 380 nm.

7. The electro-optical device according to claim 1, wherein
the non-conductive region is arranged outside the counter electrode, and
the seal member is arranged at a position that is away from the counter electrode and is different from the counter electrode in plan view.

8. An electronic apparatus comprising:
the electro-optical device according to claim 1; and
a control unit configured to control an operation of the electro-optical device.

* * * * *